United States Patent [19]

Craighead et al.

[11] 4,422,159
[45] Dec. 20, 1983

[54] OPTICAL INFORMATION STORAGE AND RETRIEVAL

[75] Inventors: Harold G. Craighead, Fair Haven; Richard E. Howard, Holmdel, both of N.J.

[73] Assignee: Bell Telephone Laboratories, Incorporated, Murray Hill, N.J.

[21] Appl. No.: 299,172

[22] Filed: Sep. 3, 1981

[51] Int. Cl.³ .............................................. G11C 13/04
[52] U.S. Cl. .................................. 365/127; 346/135.1; 369/275
[58] Field of Search ............... 365/126, 127; 369/100, 369/109, 275; 346/135.1

[56] References Cited

U.S. PATENT DOCUMENTS 3,406,405 10/1968 Somers ................................. 365/126
4,245,229 1/1981 Stephens ............................. 369/275

OTHER PUBLICATIONS

Kivits et al., "Summary Abstract: Research on Materials for Optical Storage," J. Vac. Sci. Technol., vol. 18, No. 1, Jan./Feb. 1981, pp. 68-69.
Brody, "Materials for Optical Storage: A State-of-the-Art Survey," Laser Focus, 8/81, pp. 47-52.
Haller et al., "Optical Recording of Information of Microscopically Rough Substrate", IBM Tech. Disc. Bul., vol. 22, No. 3, 8/79, p. 1234.
Craighead et al., "Microscopically Textured Optical Storage Media," Appl. Phys. Lett., vol. 39, No. 7, 10/1/81, pp. 532-534.

Primary Examiner—Stuart N. Hecker
Attorney, Agent, or Firm—Bruce S. Schneider

[57] ABSTRACT

A process employing bodies that are fabricated to have a specific configuration are useful for the storage of information such as digital data. In one embodiment a material, such as germanium, is etched to produce a structure having a multiplicity of columnar or conical features. By providing a sufficient number of these features per unit area, it is possible to store at a relatively high density a variety of information. This information storage is accomplished by melting the columns or cones in a localized area. If these structures are of the appropriate size and spacing, they appear optically absorbing before melting and a reflective region appears in the treated area. In this manner archival storage of densely packed information is possible.

23 Claims, 2 Drawing Figures

OPTICAL INFORMATION STORAGE AND RETRIEVAL

BACKGROUND OF THE INVENTION

1. Field of the Invention

This invention relates to information storage and in particular to optical information storage.

2. Art Background

A variety of systems have been proposed and employed for the optical storage of data. Exemplary of such systems is the use of tellurium alloys that are deposited on a substrate. To store information in such a medium, a localized region of the tellurium alloy is melted. By melting the tellurium alloy in a localized area, a void is produced that exposes the underlying substrate. Two storage medium configurations are employed to produce an optical change upon void formation. In the first configuration a second substrate is affixed below and spaced from a tellurium coated, transparent substrate so that an air space is provided between the two substrates. Since the tellurium alloy has a smooth surface, reflection occurs before a void is formed. After void formation, light traverses the first transparent substrate and is internally reflected in the air space until it is absorbed. Thus, the untreated surface appears reflective and the void appear black.

In a second configuration, the tellurium alloy is deposited on a transparent dielectric which in turn overlies a metallized substrate. The thickness of the dielectric is carefully chosen to produce destructive interference of the incident light used for reading the stored information. Thus before writing, the medium absorbs at the wavelength of the reading light source. Where voids are formed, the absence of the tellurium alloy precludes destructive interference of the reading light. Light is reflected from the exposed, underlying metallized surface and is thus observed. Therefore, in either configuration, digital information is represented by optically absorbing areas and optically reflective areas. By using a laser to write such information, it is possible in a tellurium based medium to store data with a storage density on the order of 30 megabits per square centimeter. (Storage density is the number of bits stored per unit surface area of the storage medium.)

Despite extensive investigation, there are still a number of considerations which make a tellurium based medium somewhat undesirable. For example, the destructive interference configuration is difficult to fabricate over large areas required for typical applications and is readable only for the narrow range of wavelengths for which the particular dielectric thickness produces destructive interference. In all configurations, the tellurium alloys employed are relatively unstable. Tellurium readily oxidizes in the atmosphere to form transparent oxides of tellurium. Obviously, the transparent tellurium oxide is no longer suitable for optical storage. To prevent extremely rapid oxidative degradation of the tellurium medium, it is necessary to employ a hermetic sealant. This sealant substantially increases the cost of the storage medium. Further, in extreme oxidation conditions such as in fires, toxic tellurium compounds are formed and present a potential health hazard. In this regard, the use of tellurium in the fabrication of such media also requires suitable precaution to insulate workers from tellurium exposure.

Additionally, the contrast between the absorbing tellurium alloy and a void, although acceptable, leads to a certain degree of error upon reading the stored information by using a light source, such as a laser, and a detector, such as a silicon photodiode to discern these optical differences. (Contrast is the ratio of the optical reflectance of the initial medium to the optical reflectance of the written medium or the inverse of this ratio, whichever is larger.) Ideally, for relatively accurate retrieval, contrasts greater than 5 to 1 are desirable. By various expedients, e.g., by increasing the tellurium alloy thickness, tellurium based storage media have been made with contrasts up to 15 to 1. However, the use of these expedients generally substantially increases the energy needed to write information. Due to the desirability of limiting energy requirements, attempts have been made to enhance the sensitivity in tellurium based media and thus reduce the energy used even in the higher contrast media. (Sensitivity is the energy necessary to record one bit of information.) For example, to increase the optical absorption a roughened surface has been produced on the tellurium material by coating it with an evaporated organic dye to increase optical absorption. (See *Journal of Vacuum Science and Technology*, Vol. 18, No. 1, page 68 (1981).)

Optical systems offer the advantage of potentially higher information storage densities as compared to other approaches to data storage. However, even the most widely investigated means for optical storage has significant disadvantages.

SUMMARY OF THE INVENTION

The use of a medium, such as exemplified by FIG. 1, having void volumes, 14, and the remaining storage structures, 16, offers two distinct advantages for use in an optical storage process. Firstly, the voids that are present in a localized area substantially reduce the amount of heat transferred in directions parallel to the storage medium surface. Thus, an optical writing process, e.g., melting a desired region of islands, is essentially confined to the area of the impacting writing energy. Lateral transfer of energy to affect adjacent areas is substantially reduced compared to the same storage material having essentially no voids. Thus, the medium is conducive to high-storage densities. Secondly, by suitably tailoring the storage structure size and spacings, a medium with very high optical absorption is produced. This high absorption in the unwritten state leads to excellent contrast and efficient use of the writing energy.

A wide variety of materials are useful for making the medium employed in the inventive process. For example, semiconductor materials such as silicon or germanium, plastics such as polystyrene, and compounds such as $GeSe_2$, are useful materials. Such materials are treated to form the desired structure, preferably by removing material to produce voids that extend from the material surface into its interior and therefore to produce the desired storage structures. To store information, energy from a source, such as a laser, is applied to a region of the medium. The energy is employed to induce a progress, e.g., melting of a storage structure, of storage structures, or of a portion of a storage structure that alters the optical properties of the treated region. By selectively altering the optical properties in a designated area, an optical difference is attained between treated and untreated regions. For example, if appropriate storage structures are present, the areas which have not been melted appear extremely black while the areas where melting has occurred form a smooth substantially more reflective surface. In this manner, an extremely high contrast is available. Additionally, by employing relatively small storage structures and with the inherent thermal isolation of these structures, a high storage density is attainable. The use of the subject bodies affords storage densities in excess of 30 megabits per $cm^2$ and contrasts in excess of 15 to 1 using nominal writing energies.

Non-toxic relatively inexpensive materials, such as silicon, germanium, and a variety of plastics are employable. The process does not depend on hermetically sealing the storage medium and thus the cost associated with such a seal is avoided. The medium is fabricated by a convenient procedure and does not require a specially tailored reading source.

DETAILED DESCRIPTION

Figure 1:
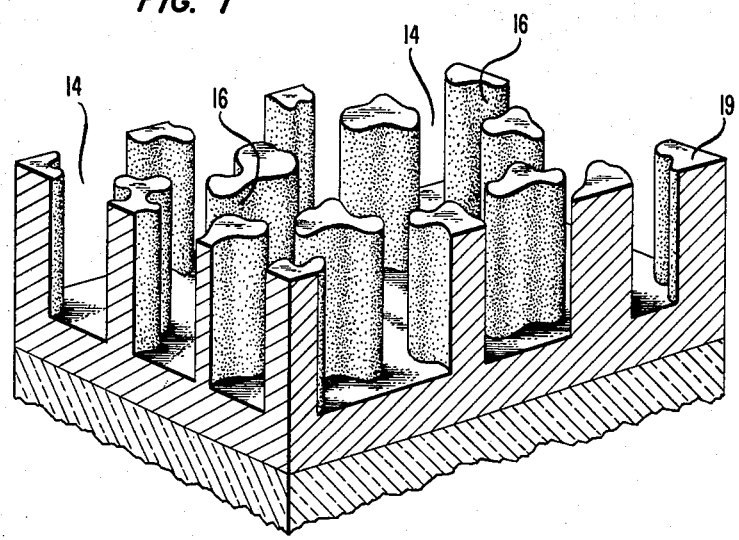
FIG. 1 and FIG. 2 illustrate storage media useful for the invention.

To produce a high contrast and a high information density, a specific profile is produced in the storage medium. In particular, structures such as shown in FIG. 1 are employed. As previously noted, this structure includes connected or disconnected voids such as 14, and storage structures such as 16. (Generally, a storage structure is an isolated island. However, configurations are contemplated, such as a single spiral storage structure occupying the entire storage medium, that include only one continuous storage structure, but which offer the desired properties.) It is apparent that by specifying the configuration and density of the storage structures or of the voids, the entire medium configuration is in turn specified. For pedagogic purposes, however, the configuration of the material will be described both in terms of the voids and storage structures. As previously discussed, use of storage structures has advantages relating to both (1) storage density through the decreased lateral transfer of thermal energy and (2) contrast. Certain criteria concerning the configuration of the medium relate only to the latter advantage. If only the former advantage is desired for a particular application, the criterion relating to the latter advantage obviously need not be considered.

A. Properties Relating to Contrast

The voids produced in the storage medium should have a mean depth that is greater than 10 percent of the absorption length in the recording medium as prepared for writing of the light that is ultimately to be used to read the stored information. (This criterion naturally assumes that the bulk material from which the recording medium is prepared is sufficiently absorbing that depths greater than 10 $\mu$m are not required. This criterion also assumes the absorption coefficient for all wavelengths in the reading light sources is approximately equal. If this assumption does not hold, this criterion should be satisfied for the absorption distance of the wavelength of highest intensity.) The mean depth is found by first measuring the distance from the lowest point of each void localized area to the void opening in a direction perpendicular to a plane tangent to the surface at the void opening. (A void localized area is a portion of a void that at the medium surface occupies an area of $10^4$ square Angstroms or an entire disconnected void that occupies less than this area.) The mean of these distances is then taken as the desired value. (Irregularities in the surface, such as defect pits less than 100 Angstroms deep, are not considered voids for the purpose of this invention.)

Similarly, the medium characteristic distance should be equal to or smaller than the wavelength of the light used for reading. (Again in the case of a multiple wavelength source, the wavelength of highest intensity is used for the purpose of this criterion.) The medium characteristic distance is the distance obtained by (1) drawing an imaginary plane that is parallel to the medium surface, 19, and half way between the surface and the average depth, (2) choosing at random points on the curves defined by the intersection of the imaginary plane with the storage structures, (100 random points in total are generally sufficient to yield a representative value), (3) drawing a line tangent to the relevant intersection curve determined in step 2 through each point, (4) drawing a line from each point through the point and perpendicular to the corresponding tangent line extending in one direction across the area bounded by the relevant intersection curve determined in step 1 and terminating where it intersects the curve, and extending in the other direction away from the area bounded by the relevant intersection curve and terminating at the first intersection with another intersection curve, (5) noting the loci of the termination points of each line from step 5, (6) measuring the distances for each point of step 4 from this point to each of its corresponding terminal points along the corresponding line of step 4, (7) calculating the median value of the distances across the voids and the mediam value of distances across storage structures from the values determined in step 7, and (8) choosing the smaller of these two values as the characteristic distance. If this criterion is satisifed (together with criterion common to both contrast and density discussed below in Section C) for a given wavelength of reading radiation the regions of the storage medium which display such structures are substantially less reflective than the bulk material. Thus, excellent contrast is achievable.

B. Properties Relating to Storage Density

To store information, the optical properties of at least an equivalent area of storage structures should be altered. (One equivalent area is the area equal to that of a circle having a diameter of the same length as the characteristic distance. The storage structure area that is altered in writing information is the total cross-sectional area of the altered structures intersected by a plane parallel to the medium surface and halfway between the surface and the mean depth.) If in the writing process it is possible to locate a specific single equivalent area and to alter it, only a single such area need occupy the writing source area. (The writing source area is defined as the cross-sectional area delineated by the writing energy at the surface of the storage medium.) However, generally for desirable writing speeds it is not possible to specifically locate any single equivalent area. For preferred writing speeds, e.g., 1 to 100 megabits/sec, it is desirable that on an average in the area to be written, at least 10, preferably at least 50 equivalent areas of storage structure occupy a writing source area. Since storage structures having dimensions on the order of 50 nm are producible, the possibility of quite high storage densities is offered.

Figure 2:
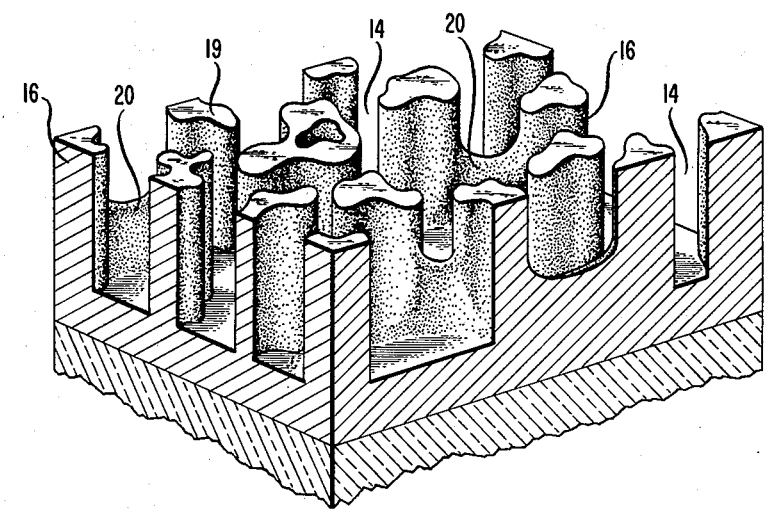

As previously disclosed, the relatively low lateral thermal transfer upon writing advantageously affects storage density. If the criterion in Section C is satisfied, then an excess of thermal interaction through an excess of interconnecting structures is avoided. For example, FIG. 2 shows webbing connections, 20, between island shaped storage structures. Yet since the medium satisfies the specified criteria excessive thermal transfer is not present.

The particular shape and wall angle of the storage structures are not critical. For example, columnar structures, such as shown in FIG. 2 or conical structures, are suitable.

C. Properties Relating to Both Storage Density and Contrast

To allow advantageous storage densities and contrasts, it is desirable that the total area of the storage structure within any region to be written is between 10 and 90 percent, preferably between 20 and 80 percent of the total area of the region. (Again, the area of a storage structure is the area of the surface formed by the intersection of an island and a plane parallel to the storage medium surface and half way between the surface and the average depth.) If this criterion is not satisfied, the medium behaves essentially as if it has no voids and the advantages of the subject process are correspondingly lost.

D. Process For Producing Exemplary Medium Profiles

A variety of techniques are available for producing storage structures and voids of appropriate dimensions. For example, a plasma etching technique that relies on the formation of a mask as described in U.S. Pat. No. 4,284,689, issued Aug. 18, 1981 (which is hereby incorporated by reference) is useful. Briefly, this process involves placing the material to be processed on a plate of sputterable material so that a portion of this sputterable material is exposed. An etchant for the storage medium is introduced and a plasma discharge is struck in this medium. The etchant medium is chosen not only to etch the storage medium but also to react with the sputterable material to produce a compound of low vapor pressure that deposits on the surface of the storage medium. The etchant is further chosen so this deposited material formed on the storage medium does not wet it but instead agglomerates into a plurality of discrete hillock-like structures. Where hillocks are absent, voids are formed and in regions under the hillocks, islands are produced. By this process, configurations are fabricated that have the appropriately dimensioned storage structures and voids for reading light of wavelength greater than 0.2 $\mu$m, preferably in the wavelength range 0.2 to 1.3 $\mu$m.

Alternatively, a process such as described in pending U.S. application Ser. No. 218,089 filed on Dec. 19, 1980 now U.S. Pat. No. 4,344,816 (which is hereby incorporated by reference) is also useful. Briefly, this process entails depositing onto the storage medium material a material which does not wet it. The mask forms discrete hillocks of material on the storage medium surface. However, in contrast to the previous method, an etchant is specifically chosen which etches both the mask material and the storage medium. Additionally, this etchant is chosen so that the rate of etching for the mask material is more than 2 times slower than the rate of etching for the storage medium. By placing the masked storage medium in the etchant material and striking a discharge, etching proceeds and conical storage structures having appropriate dimensions are produced for reading light of a wavelength greater than 0.2 $\mu$m, preferably in the range 0.2 to 1.3 $\mu$m.

E. The Process of Writing Information

The storage medium material is chosen so that it is possible to alter its optical properties. For example, it is possible to produce such alteration by melting a storage structure, evaporating a storage structure, or altering the absorption properties of an island through a radiation induced change which does not affect the island geometry, e.g., converting an absorbing material, such as a silicon to a transparent oxide. For typical writing sources such as lasers, sufficient energy is produced to alter suitable storage media. For typical materials and for writing times in the range of 50 nanosec to 10 microsec, writing sources delivering an energy level in the range 1 to 100 mwatts/$\mu$m$^2$ produce desirable alterations, e.g., melting, required for changing the optical properties of the storage medium. (Lower energy levels are suitable if slower writing times are acceptable.) Exemplary of useful materials are silicon, germanium, and metal coated polystyrene. The spectral distribution of the writing source should be chosen so that at least 10 percent of its energy is absorbed in the storage medium. For example, an Ar of He-Ne laser source respectively are useful for silicon, germanium and metal coated polystyrene. To write information, regions of the storage medium are melted in a configuration coded to the desired information. For example, highly reflective areas produced through the writing process could be assigned a value of one and absorbing regions could be assigned a zero value. In this manner, digital information is easily stored. Although this procedure is the preferred method of producing a written storage medium, it is also contemplated that a master copy of a written medium is producible by the preferred method and that copies are manufactured from this master by procedures such as stamping.

F. Protecting The Storage Medium

Although not essential, it is desirable to protect the storage medium from abrasion. In this regard it is possible to cover the storage media after writing with an inexpensive protective coating, such as poly(methyl methacrylate). However, for materials such as germanium an even more desirable alternative is possible. It is possible to coat germanium before writing with a relatively inexpensive material, such as poly(methyl methacrylate). The writing process is performable with the protective coating already in place. For example, by using a Ar-ion laser, storage structures in the germanium are melted through the transparent poly(methyl methacrylate) coating. Thus, the storage medium is protective from abrasion even before the writing procedure.

The following examples are illustrative of the invention.

EXAMPLE 1

A one-inch square glass substrate was cut from a microscope slide. The substrate was cleaned by first immersing it in a hot water solution of detergent. The solution was ultrasonically agitated for approximately 5 minutes. The substrate was then sequentially rinsed in hot water and deionized water, scrubbed with a lint-free foam swab in deionized water, and again cleaned in a vapor degreaser by sequentially treating it with trichloroethane and isopropyl alcohol.

The cleaned substrate was placed in the sample holder of a diffusion pumped vacuum deposition station. The substrate was positioned approximately 5 inches above the evaporation source with a major surface exposed to this source. The evaporation source had two crucibles respectively containing niobium and silicon. Evaporation from the crucibles was induced by striking the contents of the crucible with a 4 kilovolt electron beam. The power density of the beam was adjusted to yield an evaporation deposition rate of approximately 3 Angstroms per second. The chamber was evacuated and the substrate was heated to approximately 450 degrees C. Using the first crucible containing the niobium, approximately 180 Angstroms of niobium was deposited onto the substrate. (The niobium was deposited to improve the adhesion of the subsequently deposited silicon to the glass substrate.) During the niobium deposition, the vacuum chamber was maintained at a pressure of approximately $10^{-5}$ Torr. After the deposition of the niobium layer, a 1.25 micron thick layer of silicon was deposited by employing the second crucible in a similar manner. The evaporation rate employed for producing the silicon layer was approximately 60 Angstroms per second and the chamber pressure during the silicon evaporation was approximately $6 \times 10^{-5}$ Torr.

The reactive ion etching process was done using a conventional diode sputtering system. The system used an oil diffusion pump with an optically dense water-cooled baffle and a liquid nitrogen cooled trap. The plasma was generated by a 13.56 MHz rf generator connected to two parallel, water-cooled electrodes 5 inches in diameter. The rf matching network on the sputtering system was tuned to supply all of the power to the electrode on which the samples were to be etched. The electrode on which the samples were etched was covered with a 5 inch diameter aluminum plate which was thermally connected to the water-cooled electrode. The second electrode was covered with fused quartz and electrically grounded.

The flow of the reactive gases through the sputtering systems was controlled using both pressure and flow-ratio servo systems. A capacitance manometer was used to monitor the pressure. The signal from this manometer was used to adjust the flow of $CCl_2F_2$. (This may be designated as the main gas.) The flow of the other two gases $O_2$ and Ar was controlled by a flow/ratio controller. By this means, either the flow of the secondary gases or the ratio of their flow to the main gas flow could be held constant. The flow rate of all the gases was monitored using a thermal mass flow meter with a 100 standard cubic centimeter per minute (SCCM) full scale sensitivity. The gases were mixed in an external manifold before entering the station. The manifold was heated to approximately 48 degrees C. to reduce adsorption of gases on the walls.

The cleaned silicon sample was placed in the center of the aluminum plate with the deposited silicon upward and the system was pumped down to a pressure of less than 1 mTorr. Argon, $CCl_2F_2$, and oxygen were fed into the chamber at equal rates of 10 SCCM using the flow control system described above. (It should be noted that equal rates are not equivalent to equal mole fraction and that relative pumping speeds of gases determine the actual mole fraction in the plasma.) The total pressure in the chamber was controlled to be 20 mTorr. The rf power was turned on to 0.5 W/cm$^2$ giving a self bias of $-540$ V on the aluminum plate. The power was applied for a total of 6 minutes.

The treated silicon was removed from the etching apparatus and placed on the normal sample position of an optical microscope. The light from an Ar laser (wavelength of 488 nm) was directed through the vertical illuminator and 10× objective of the microscope and focused onto the surface of the sample. The beam was modulated using a Pockels cell. Spots were written on the silicon medium using pulses of 1 microsec duration with the beam having a power of approximately 25 milliwatts at the sample. Before treatment the material appeared black when viewed through the microscope and for each pulse a reflective region was produced that had a size on the order of 1 μm.

EXAMPLE 2

The procedure of Example 1 was followed except the configuration produced was formed by sequentially depositing on the glass substrate a molybdenum layer, a silicon oxide layer and a germanium layer. A 1000 Angstrom thick molybdenum layer was deposited in an electron beam evaporation station as described in Example 1. During this deposition the substrate was maintained at 200 degrees C., the pressure was approximately $10^{-6}$ Torr and the evaporation rate was approximately 10 to 20 Angstroms per second.

The substrate was then transferred to a standard thermal evaporation station. The boats of this evaporation station contained, respectively, silicon monoxide and germanium. The boat containing the silicon monoxide was heated by electrical resistance to a temperature sufficient to produce an evaporation deposition rate of approximately 30 Angstroms per second. The evaporation was continued until a layer thickness of 1000 Angstroms was obtained. The heating of the silicon monoxide boat was then discontinued and the boat containing the germanium was similarly heated to a temperature that produced an evaporation deposition rate of approximately 20 to 40 Angstroms per second. This evaporation was continued to produce a germanium layer of approximately 1 μm in thickness. (The substrate was not heated during the deposition of the silicon monoxide of germanium.)

During the etching procedure, as described in Example 1, the treatment time employed was 4 minutes rather than 6 minutes and the cathode bias was $-500$ V. Writing was accomplished using a one-half microsecond pulse duration with a beam with a power of approximately 10 milliwatts. The spots produced were observed in an electron microscope to have a diameter of approximately 1 μm.

The same procedure was followed except in one sample the silicon oxide layer was omitted and in a second sample both the silicon oxide layer and the molybdenum layer were omitted. The results achieved were approximately the same as with the sample containing all these layers.

EXAMPLE 3

A glass slide was prepared as described in Example 1. A 15 percent solution by weight of polystyrene in xylene was prepared. A sufficient amount of this solution was placed on the substrate so that upon spinning the substrate at 2000 RPM a film with a thickness of approximately 1 micron was obtained. The film was baked at 130 degrees C. for 30 minutes. A layer of tin having a thickness of approximately 150 Angstroms was deposited onto the polystyrene using the thermal evaporation procedure described in Example 2. The deposition rate that was achieved during this thermal evaporation was between 8 and 10 Angstroms per second.

The substrate was etched as described in Example 1 except the etchant gas included only oxygen. The oxygen was introduced at a flow rate of 10 SCCM to a total pressure of 10 mTorr. The substrate was etched at a total power of 0.4 watts per cm$^2$ at a cathode bias of 750 V for 10 minutes. (The tin does not wet the polystyrene and was employed as an etch mask.) Columnar structures were observed in a electron microscope after etching.

A 1200 Angstroms thick layer of gold was thermally evaporated as described in Example 2 onto the polystyrene surface by rotating the sample during deposition at a rate of approximately 4 rotations per second at a angle relative to the evaporation flux of approximately 45 degrees. This angular evaporation ensured that the polystyrene columnar structures were essentially evenly coated with gold. (The thickness given for the gold layer is that which it would have had if it had been deposited on a flat plane rather than a columnar surface.) Before the gold evaporation, the substrate was optically transparent since polystyrene essentially does not absorb in the visible. After the gold evaporation, the structure appeared black. The writing was performed using the same laser as described in Example 1 but employing as an optical system a 0.8 cm focal length converging lens. The laser was not pulsed. Instead, the sample was translated to produce a linear written track approximately 20 microns wide and several millimeters long. The laser power employed was approximately 200 milliwatts. The result was not as consistent as obtained in Example 1 or 2. However, the track appeared light through reflection and/or through transmission of light to the observer from under the substrate through voids produced through the thickness of the treated region. Electron microscopy indicated that the columns had melted under the influence of the light beam.

EXAMPLE 4

The procedure of Example 2 was followed except an approximately 1 micron thick layer of poly(methyl methacrylate) was coated onto the surface of the germanium layer. This was done by spinning the substrate at a rate of approximately 1800 RPM using a 6 percent by weight solution of poly(methyl methacrylate) in chlorobenzene. Essentially the same results were obtained as compared to the sample of Example 1.

What is claimed is:

1. A process for storing information in a storage medium comprising the steps of treating said storage medium with a source of energy so that optical changes which define said information are produced in said storage medium characterized in that said storage medium comprises a material having a region that has a configuration including void volumes that delimit storage structures wherein the total area of all said storage structures in said region is between 10 and 90 percent of the area of a plane at the medium surface coextensive with said region wherein the characteristic distance of said configuration is equal to or smaller than the wavelength of the electromagnetic radiation ultimately used to read said information, and wherein an optical change is induced with said source of energy by altering the optical properties of said storage structures that are impacted by said energy in a region where information is to be stored.

2. The process of claim 1 wherein said void volume has a mean depth greater than 10 percent of the absorption length of said storage medium for the electromagnetic radiation ultimately to be used to read said information.

3. The process of claim 1 wherein said storage medium is coated with an abrasive resistant material.

4. The process of either claim 1 or 2 wherein said source of energy is a laser.

5. The process of either claim 1 or 2 wherein said material comprises a substance chosen from the group consisting of germanium, silicon and polystyrene.

6. The process of either claim 1 or 2 wherein said optical change is induced by melting.

7. The process of either claim 1 or 2 wherein on average at least 10 equivalent areas of storage structure measured at half the average depth of said void volume occupy an area delineated by the cross-section of said source of energy at the surface of said medium and wherein said equivalent area is equal to the area of a circle having a diameter length the same as said characteristic distance.

8. The process of claim 7 wherein at least 50 equivalent areas of surface structure occupy said area delineated by said source of energy.

9. The process of claim 7 wherein said source of energy is a laser.

10. The process of claim 7 wherein said material comprises a substance chosen from the group consisting of germanium, silicon, and polystyrene.

11. The process of claim 10 wherein said optical change is induced by melting.

12. The process of claim 7 wherein said optical change is induced by melting.

13. The process of claim 12 wherein said abrasive resistant material is poly(methyl methacrylate).

14. An article for storing information comprising a storage medium comprising a material having a region with a first optical characteristic that has a configuration including void volumes that delimit storage structures and written regions that correspond to a region of storage structures altered to have a second optical characteristic wherein the characteristic distance of said configuration is equal to or smaller than the wavelength of the electromagnetic radiation ultimately used to read said information, wherein said regions correspond to said information, and wherein the sum of the areas of said storage structures in said region of first optical characteristic is between 10 and 90 percent of the area of a plane at the medium surface coextensive with said region of first optical characteristic.

15. The storage medium of claim 14 wherein eaid void volume has a mean depth greater than 10 percent of the absorption length of said storage medium from the electromagnetic radiation ultimately to be used to read said information.

16. The article of either claim 14 or 15 wherein on average at least 10 equivalent areas of storage structure measured at half the average depth of said void volume, occupy an area delineated by the cross-section of said source of energy at the surface of said medium and wherein said equivalent area is equal to the area of a circle having a diameter of the same length as said characteristic distance.

17. The article of claim 16 wherein at least 50 equivalent areas of surface structure occupy said area delineated by said source of energy.

18. The storage medium of claim 16 wherein said source of energy is a laser.

19. The storage medium of claim 16 wherein said material comprises a substance chosen from the group consisting of germanium, silicon and polystyrene.

20. The storage medium of claim 16 wherein said optical change is induced by melting.

21. The storage medium of either claim 14 or 15 wherein said source of energy is a laser.

22. A storage medium of either claim 14 or 15 wherein said material comprises a substance chosen from the group consisting of germanium, silicon and polystyrene.

23. The storage medium of either claim 14 or 15 wherein said optical change is induced by melting.

* * * * *